United States Patent [19]
Hamilton

[11] 4,116,406
[45] Sep. 26, 1978

[54] HANG GLIDER HAVING INFLATABLE AIRFOIL

[76] Inventor: Paul D. Hamilton, Apt. 11E River Run Apts., New Hartford, Conn. 06057

[21] Appl. No.: 807,412

[22] Filed: Jun. 17, 1977

[51] Int. Cl.$^2$ .......................................... B64C 31/02
[52] U.S. Cl. .................................... 244/16; 244/219; 244/DIG. 1
[58] Field of Search .............. 244/16, DIG. 1, 153 R, 244/138 R, 218, 219, 145, 142

[56] References Cited

U.S. PATENT DOCUMENTS

| | | | |
|---|---|---|---|
| Re. 26,427 | 7/1968 | Jalbert | 244/142 |
| 2,764,375 | 9/1956 | Lemoigne | 244/145 |
| 3,524,613 | 8/1970 | Reuter et al. | 244/142 |
| 3,558,087 | 1/1971 | Barish | 244/142 |
| 3,749,337 | 7/1973 | Jalbert | 244/DIG. 1 X |
| 3,822,844 | 7/1974 | Sutton | 244/145 |
| 3,944,169 | 3/1976 | Bede | 244/16 |

FOREIGN PATENT DOCUMENTS 2,310,258  5/1975  France ............................. 244/DIG. 1
2,549,393  5/1977  Fed. Rep. of Germany ............ 244/16

OTHER PUBLICATIONS

"Phoenix SX Soaring Kite" Hang Gliding, Don Poynter, 1976, p. 158.
"Phoenix SX", "Hang Gliding", Dec. 1976.

*Primary Examiner*—Barry L. Kelmachter

[57] ABSTRACT

A high performance hang glider includes a frame to which is attached flexible sail fabric to create a delta-shaped Rogallo wing. The sail is of double thickness throughout a substantial portion of the wing area to provide an envelope inflatable in flight by air entering an intake opening at the nose of the wing and exhausting through nozzles in the underside of the wing tips. A more efficient double-surface airfoil is thus provided which automatically changes its camber in response to changes in speed for optimum performance.

15 Claims, 3 Drawing Figures

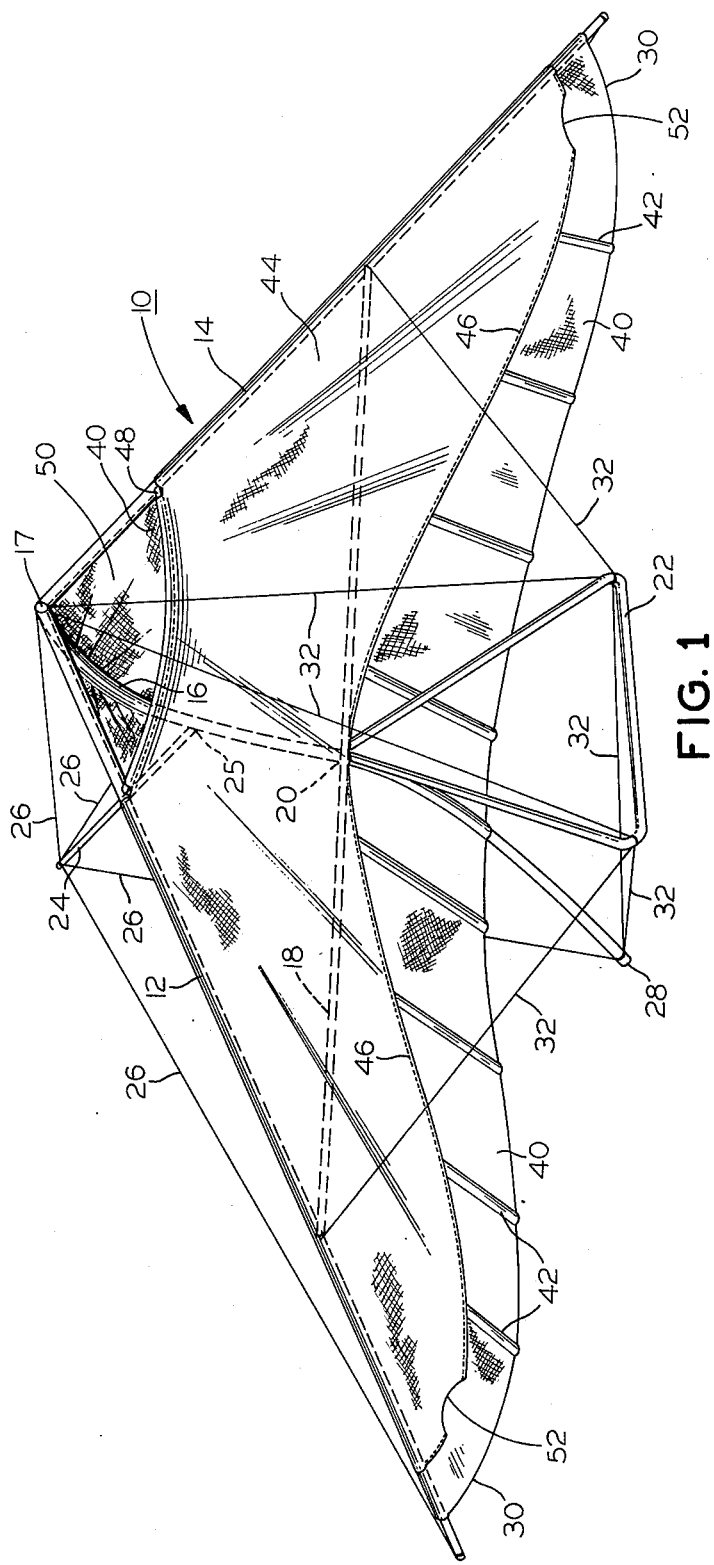
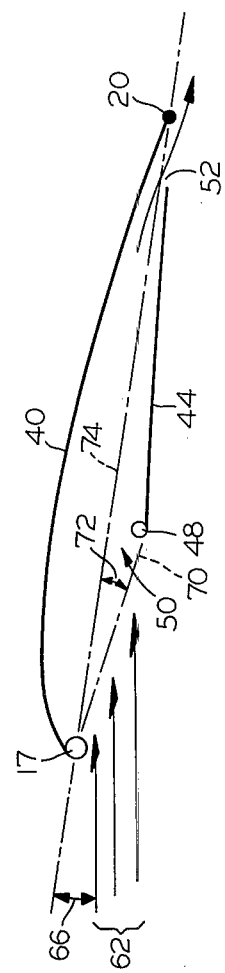
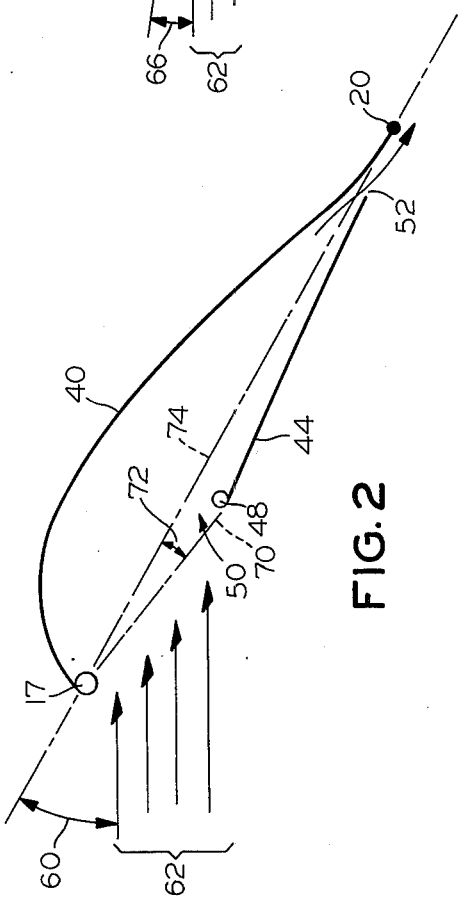

HANG GLIDER HAVING INFLATABLE AIRFOIL

BACKGROUND OF THE INVENTION

In recent years, hang gliding has become an extremely popular sport serving the age old fascination and thrill of flight without the expense of powered flight. Modern hang gliders are light weight and capable of being folded up, much like a tent, for convenient transport. Any reasonably open terrain rising to a prominence facing a prevailing wind is suitable for foot launched flight. Under favorable conditions, flights of several hours duration can be achieved.

The most popular hang glider is the flexible delta wing design named after Francis Rogallo, who developed this design in connection with NASA's rocket re-entry program. The Rogallo wing consists of a single surface sail affixed to a frame comprised basically of keel, a pair of diverging leading edge members, and a cross member, much in the manner of a traditional kite design. Suspended from this frame is a control bar and a harness in which the flyer is strapped. Flight maneuvers are effected by grasping the control bar and executing body movements designed to shift the pilot's weight. Standard Rogallo wings have a typical glide ratio of 4 to 1.

It is an object of the present invention to provide an improved hang glider of the Rogallo wing type.

Another object of the present invention is to provide a hang glider of the above character having improved performance under all flight conditions.

A further object is to provide a hang glider of the above character having a double surfaced airfoil for improved leftover drag ratio.

Yet another object is to provide a hang glider of the above character wherein the camber of the airfoil automatically adjusts to variations in angle of attack so as to provide optimum performance at all flight speeds.

Still another object is to provide a hang glider of the above character which is simple in design, light weight, highly portable, easy to set up and to fly, and dynamically stable.

Other objects of the invention will in part be obvious and in part appear hereinafter.

SUMMARY OF THE INVENTION

In accordance with the present invention, there is provided an improved hang glider design capable of achieving significantly improved performance characteristics, particularly in terms of lift versus drag or glide ratio. To this end, a double surface airfoil is created to achieve improved lift and reduced drag for a given angle of attack, i.e., the angle at which the airstream intercepts the wing surface. With improved lift versus drag, the glide ratio is enhanced. Moreover, improved lift is achieved for all angles of attack by providing for appropriate automatic changes in the curvature or camber of the wing surfaces in response to changes in the angle of attack. In other words, the wing of the present invention automatically assumes the optimum camber for maximum lift and minimum drag at all angles of attack. More specifically, the hang glider of the present invention includes a frame to which is attached a sail fabric of double thickness over a substantial portion of the wing area. The sail thus provides an envelope which, in flight, is inflated by air entering through an intake opening provided in the underside of the Rogallo wing adjacent its nose. Air is exhausted from the envelope through nozzles located in the underside of the wing adjacent each tip. The plane of the intake opening is oriented at an acute angle to the keel of the frame such that the projected area of the intake opening normal to the inflight air stream is directly related to the angle of attack. That is, as the angle of attack is increased, the projected area of the intake opening is increased to accommodate the entry of more air. This increases the pressure within the envelope, and the wing of airfoil becomes thicker, as is desired for flight at larger angles of attack.

The increased camber, i.e., curvature, of the wing causes the air to move faster over the upper surface of the wing, thus enhancing lift at the lower air speeds associated with larger angles of attack. On the other hand, at small angles of attack, the projected area of the intake opening is also small, and less air enters the envelope. The pressure within the envelope decreases, as does the camber of wing. The wing thus becomes thin and streamlined, the optimum airfoil cross-section for the higher airspeeds associated with small angles of attack.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 1 is a perspective view of a hang glider constructed in accordance with the present invention;

FIG. 2 is an idealized, diagrammatical view of the airfoil cross-section, illustrating its camber during flight at a large angle of attack; and FIG. 3 is an idealized diagrammatical view of the airfoil cross-section, illustrating its camber during flight at a small angle of attack.

Similar reference numerals refer to corresponding parts throughout the several views of the drawings.

DETAILED DESCRIPTION

The hang glider of the present invention, generally indicated at 10 in FIG. 1, is in the form of a Rogallo wing having a frame consisting of a pair of leading edge members 12 and 14 pivotally interconnected in conventional fashion to the forward end of a keel 16 at the nose 17 of the wing. The leading edge members are also interconnected at corresponding locations along their lengths by a cross member 18 which serves to hold the leading edge members in a swept-back, V-shaped configuration. At the intersection 20 of the keel 16 and cross member 18, a suitable bracket, not shown, joins these to frame members. A triangular control bar 22 is suspended from the frame at intersection 20 of the keel and cross member. An upright king post 24 is affixed at its lower end 25 to keel 16, while its upper end is tied in conventional fashion to the frame by an array of individual cables 26 running to the nose 17, the trailing end 28 of the keel, and to the outer ends of leading edge members 12, 14 at the tips 30 of the wing. The control bar 22 is also tied to the frame by an array of cables 32 running from the two lower corners of the control bar to the nose 17, keel trailing end 28 and the connections of the cross member 18 with the leading edge members 12 and 14. The cables 32 may be replaced by essentially rigid struts, and, as a result, the king post 24 and cables 26 may be eliminated. The various frame members are preferably formed of light weight tubular stock of aircraft quality. While not shown, it will be understood that a suitable harness, in which the pilot is strapped, is suspended from the frame at the intersection 20 of the cross member 18 and keel 16.

In accordance with the present invention, the sail of a suitable material such as Dacron, is attached to the frame in a manner as to provide a double thickness over a major portion of the wing area. To this end, a top sheet 40 of sail has its leading edge portion looped back on itself and seamed to provide sleeves through which the leading edge members 12 and 14 are inserted. Along the longitudinal centerline off sail sheet 40 a tuck is taken and seamed to provide a sleeve through which keel 16 is inserted. If desired, pockets may be sewn in along the trailing edge portion of top sheet 40 to receive battens 42, a common expedient to provide pitch stability and reduce sail flapping and thus drag.

To provide the double sail thickness, a bottom sheet 44 of sail fabric, except in the vicinity of nose 17, has its leading edge seamed to the leading edge portion of top sheet adjacent the seams utilized in forming the sleeves receiving the leading edge members. The trailing edge of bottom sheet 44 is joined to the top sheet 40 by a sewn seam 46 located just forwardly of the sewn pockets accommodating battens 42. Preferably, this seam intersects the intersection 20 where the cross members 18 and keel 16 are joined and from which the control bar 22 and harness (not shown) are suspended. It is also preferable that the cross member in its extension between the leading edge members be accommodated between the top and bottom sail sheets to reduce drag. Included as part of the frame is a rib 48 which is affixed at its ends to the leading edge members 12, 14 at locations equally spaced from nose 17. The central leading edge portion of bottom sail sheet 44 is looped around rib 48 and seamed to provide a sleeve accommodating the rib. Preferably, the rib is preformed in the downwardly bowed or curved configuration seen in FIG. 1. Suitable cable rigging (not shown) may be added between the rib and other members of the frame to stabilize the rib position in flight.

From the description thus far, it is seen the top and bottom sail sheets provide an envelope which, in flight, is inflated by air rammed into the envelope through an intake opening 50 centrally located in the underside of the wing adjacent nose 17. The shape of this intake opening is maintained by rib 48. Once the envelope is inflated, the wing becomes a double surface airfoil, which inherently provides improved flight characteristics in terms of lift versus drag ratio over the traditional single surfaced airfoil utilized in conventional Rogallo wings. To provide a dynamic condition, the envelope is exhausted through exhaust nozzles 52 located in the trailing edge of the envelope adjacent the wing tips. These exhaust nozzles may be created simply by providing interruptions in the seam 46. Thus, ram air entering the envelope through intake 50 is exhausted through nozzles 52 to create a dynamic movement of air through the envelope. It will be appreciated that the cumulative area of the exhaust nozzles is less than the area of the intake opening to maintain inflation of the envelope. Without the exhaust nozzles, a static condition would be created, wherein the air inflating the envelope would be essentially trapped therein. Consequently, additional air could not be rammed into the envelope through the intake opening, and undesirable inflight turbulence would be produced adjacent the nose of the wing.

By virtue of the location of the intake opening 50 in the underside of the wing adjacent its nose and the angular orientation of intake opening relative to the frame of the wing, certain advantages are achieved as will be understood in connection with FIGS. 2 and 3. Specifically, the location and orientation of the intake opening are instrumental in creating an airfoil whose camber automatically adjusts to variations in angle of attack in a manner to essentially optimize lift and minimize drag for all flight conditions. FIG. 2 diagrammatically illustrates the camber assumed by the envelope portion of the airfoil for the low speed flight associated with a large angle of attack, while FIG. 3 illustrates the camber assumed by the airfoil for the high speed flight associated with a small angle of attack. As is well understood, the angle of attack refers to the angle at which the prevailing airstream intercepts the airfoil. Before considering FIGS. 2 and 3 in detail, it should be understood that these figures are somewhat idealized cross-sections of the airfoil resorted to for convenience sake. That is, the leading portion of the airfoil cross-section is taken along the longitudinal axis of the wing to depict the intake opening 50, while the remaining, trailing portion of the airfoil cross-section depicts the airfoil camber at a representative location laterally displaced from the longitudinal axis where the curvature of the upper airfoil surface (sail sheet 40) is necessarily determined by the configuration of keel 16. Also, to simplify the drawings, the exhaust nozzles 52 are diagrammatically illustrated in FIGS. 2 and 3. However, it will be understood that these exhaust nozzles may be located anywhere along seam 46, but preferably are located out near the tips of the wing, as illustrated.

Turning to FIG. 2, the wing is depicted in a large angle of attack 60 relative to the prevailing airstream 62, an attitude assumed to lower the flight speed. By virtue of the location and orientation of the intake opening 50, the projected area of this opening normal to the airstream increases as the angle of attack increases. Consequently, with increasing angles of attack, greater quantities of air are rammed into the intake opening. This increases the pressure within the envelope, and the sail sheets, particularly the top sheet 40, bulge. Also contributing to the increase in the pressure within the envelope is the fact that the pressure exerted by the airstream on the underside of the airfoil also increases as the angle of attack increases; this increased pressure acting to constrict the exhaust nozzles 52 and thus reducing the rate at which air is exhausted from the envelope. Since the portion of top sheet 44 providing the upper airfoil surface is essentially free floating, it will inherently assume a camber of increased curvature or reflex consistent with minimum drag. This bulging or increased curvature of the top sail sheet increases the velocity of the air flowing over the upper airfoil surface, causing a reduction in pressure which, coupled with the increase in pressure on the lower airfoil surface, results in significant lift enhancement at large angles of attack. It is thus appreciated that the hang glider of the present invention is capable of flying at slower speeds, i.e., larger angles of attack, than conventional single surfaced hang gliders of the Rogallo wing type. That is, the instant hang glider has excellent stall characteristics and significally increased stall angle as compared to conventional hang gliders.

FIG. 3 illustrates the attitude of the airfoil for high speed flight, i.e., a low angle of attack 66. In this situation, it is seen that the projected area of the intake opening normal to the prevailing air stream 62 is significantly less than in the large angle of attack situation of FIG. 3. Consequently, the volumetric rate at which air is rammed into the airfoil envelope is reduced and the air pressure within the envelope is relaxed. Moreover, the air pressure acting against the underside of the airfoil is decreased, allowing the exhaust nozzles to open up. Air is thus exhausted from the envelope at a more rapid rate. With the consequent reduction in the airfoil internal pressure, the airfoil automatically assumes a camber of reduced curvature to provide a slim profile conducive to an optimum lift versus drag ratio at high flight speeds.

From the foregoing description, it is seen that the camber of the airfoil is automatically adjusted by the coaction of the internal air pressure of the envelope and the laminar flow of air over the airfoil surfaces to assume the appropriate curvature for any angle of attack, i.e., flight speed. In order for this automatic adjustment to be effected in accordance with the present invention, it is important to locate the intake opening in the underside of the wing adjacent its nose and to angularly orient the plane of the intake opening in manner such as to accentuate the variation of its projected area in direct relation to variations in the angle of attack. To this end, I have found that an appropriate angular orientation of the intake opening can be determined by positioning rib 48 such that a line 70 drawn from nose 17 to the midpoint or lowest point of the rib lies at any angle 72 of 30° or less, i.e., in the range of 30° to 0°, relative to a chord line 74 drawn from nose 17 to the point where the trailing edge of the envelope and the keel meet, which in the illustrated embodiment is intersection 20. I have also found that to achieve the desired double surface airfoil effect in accordance with the present invention, the double sail thickness constituted by the top and bottom sheets, i.e., the inflatable envelope, should constitute at least fifty percent, but preferably seventy-five percent or more of the wing area.

While the present invention has been illustrated in its application to hang gliders of the Rogallo wing type, it will be appreciated it can be applied to other types of hang gliders, as well as sailplanes.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described the invention, what is claimed as new and desired to secure by Letters Patent is:

1. A hang glider having a wing comprising, in combination:
   A. a rigid frame including
      (1) a pair of leading edge members, adjacent ends of said members interconnected at a location corresponding to the nose of the wing and serving to define the leading edges of the wing, and
      (2) a keel interconnected at its leading end to said leading edge members at the nose of the wing and extending rearwardly to the trailing edge of the wing;
   B. a sail affixed to said frame, said sail including top and bottom fabric sheets joined along the leading edges of the wing and along a seam adjacent to and coextensive with the trailing edge of the wing to define an envelope;
   C. means located at the nose of the wing forming an intake opening in said envelope through which an airstream enters to inflate said envelope and thereby create a double surface airfoil constituting at least fifty percent of the wing area.

2. The hang glider defined in claim 1, wherein the plane of said intake opening is oriented at an angle of from thirty to zero degrees relative to a chord line drawn from the junction of said leading edge members and said keel to the intersection of said keel and said seam.

3. The hang glider defined in claim 2, wherein said double surface airfoil constitutes at least seventy-five percent of the wing area.

4. The hang glider defined in claim 1, which further includes means forming at least one exhaust opening in said envelope located at said seam.

5. The hang glider defined in claim 1, which further includes means forming plural exhaust openings in said envelope located at said seam adjacent each wing tip.

6. The hang glider defined in claim 5, wherein said exhaust openings are provided by discontinuities in said seam.

7. The hang glider defined in claim 6, wherein, at least adjacent the locations of said exhaust openings, said top sheet extends beyond said seam to the trailing edge of the wing.

8. The hang glider defined in claim 1, wherein said frame further includes a crossbar interconnecting said leading edge members at locations equidistant from the nose of the wing, said crossbar accommodated wholly within said envelope.

9. The hang glider defined in claim 1, wherein said intake opening forming means includes a rib connected to and extending between said leading edge members adjacent the nose of the wing, the leading edge portion of said bottom sheet adjacent the nose of the wing affixed to said rib, the leading edge portion of said top sheet adjacent the nose of the wing affixed to said leading edge members.

10. The hang glider defined in claim 9, which further includes means forming plural exhaust openings in said envelope located at said seam adjacent each wing tip.

11. The hang glider defined in claim 10, wherein said exhaust openings are provided by discontinuities in said seam, and wherein, at least adjacent the locations of said exhaust openings, said top sheet extends beyond said seam to the trailing edge of the wing.

12. The hang glider defined in claim 11, wherein said frame further includes a crossbar interconnecting said leading edge members at locations equidistant from the nose of the wing, said crossbar accommodated wholly within said envelope.

13. The hang glider defined in claim 12, wherein the plane of said intake opening is oriented at an angle of from thirty to zero degrees of relative to a chord line drawn from the junction of said leading edge members and said keel to the intersection of said keel and said seam.

14. The hang glider defined in claim 13, wherein said double surface airfoil constitutes at least seventy-five percent of the wing area.

15. The hang glider defined in claim 9, wherein said top sheet is affixed to said keel.

* * * * *